United States Patent
Mangalvedhe et al.

(10) Patent No.: US 12,127,261 B2
(45) Date of Patent: Oct. 22, 2024

(54) IMPROVING RELIABILITY OF MOBILE-TERMINATED (MT) EARLY DATA TRANSMISSION (EDT)

(71) Applicant: NOKIA TECHNOLOGIES OY, Espoo (FI)

(72) Inventors: Nitin Mangalvedhe, Hoffman Estates, IL (US); Srinivasan Selvaganapathy, Bangalore (IN); Rapeepat Ratasuk, Inverness, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 371 days.

(21) Appl. No.: 17/641,626

(22) PCT Filed: Sep. 10, 2019

(86) PCT No.: PCT/US2019/050263
§ 371 (c)(1),
(2) Date: Mar. 9, 2022

(87) PCT Pub. No.: WO2021/050045
PCT Pub. Date: Mar. 18, 2021

(65) Prior Publication Data
US 2022/0330345 A1    Oct. 13, 2022

(51) Int. Cl.
*H04W 74/0833* (2024.01)
*H04W 74/00* (2009.01)

(52) U.S. Cl.
CPC ..... *H04W 74/0833* (2013.01); *H04W 74/002* (2013.01)

(58) Field of Classification Search
CPC ................ H04W 74/0833; H04W 74/002
See application file for complete search history.

(56) References Cited

U.S. PATENT DOCUMENTS

| | | |
|---|---|---|
| 2009/0201798 A1 | 8/2009 | Lee et al. |
| 2012/0300714 A1 | 11/2012 | Ng et al. |
| 2013/0058315 A1 | 3/2013 | Feuersänger et al. |
| 2014/0334389 A1 | 11/2014 | Abdel-Samad et al. |
| 2017/0367120 A1 | 12/2017 | Murray et al. |
| 2018/0279380 A1* | 9/2018 | Jung ................. H04W 74/0833 |

(Continued)

FOREIGN PATENT DOCUMENTS

| | | |
|---|---|---|
| WO | WO 2017/146921 A1 | 8/2017 |
| WO | 2018127120 A1 | 7/2018 |

OTHER PUBLICATIONS

International Search Report and Written Opinion dated Nov. 15, 2019 corresponding to International Patent Application No. PCT/US2019/ 050263.

(Continued)

*Primary Examiner* — Elton Williams
(74) *Attorney, Agent, or Firm* — Lippes Mathias LLP

(57) ABSTRACT

Systems, methods, apparatuses, and computer program products for improving reliability of mobile-terminated (MT) early data transmission (EDT). The method can include receiving, from a primary transmit receive point (TRP), a message. The method may include transmitting, to the primary TRP, an indication of a capability to receive a multi-TRP transmission of a message 4 of a random access procedure. The indication may be a physical random access channel (PRACH) preamble.

20 Claims, 10 Drawing Sheets

(56) References Cited

U.S. PATENT DOCUMENTS

2018/0324863 A1    11/2018  Akoum et al.
2019/0104553 A1*   4/2019   Johansson ......... H04W 74/0833
2019/0199412 A1    6/2019   Koskela et al.

OTHER PUBLICATIONS

3GPP TS 36.300 V15.6.0 (Jun. 2019), Technical Specification, 3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2019.

3GPP TS 36.321 V15.6.0 (Jun. 2019), Technical Specification, 3rd Generation Partnership Project; Technical Specification Group Radio Access Network; Evolved Universal Terrestrial Radio Access (E-UTRA); Medium Access Control (MAC) protocol specification (Release 15), Jun. 2019.

Extended European Search Report dated Mar. 15, 2023, corresponding to European Patent Application No. 19945278.0.

Office Action dated Aug. 8, 2022, corresponding Indian Patent Application No. 202247020413.

Notice of Allowance received for corresponding European Patent Application No. 19945278.0, dated Jul. 11, 2024, 8 pages.

\* cited by examiner

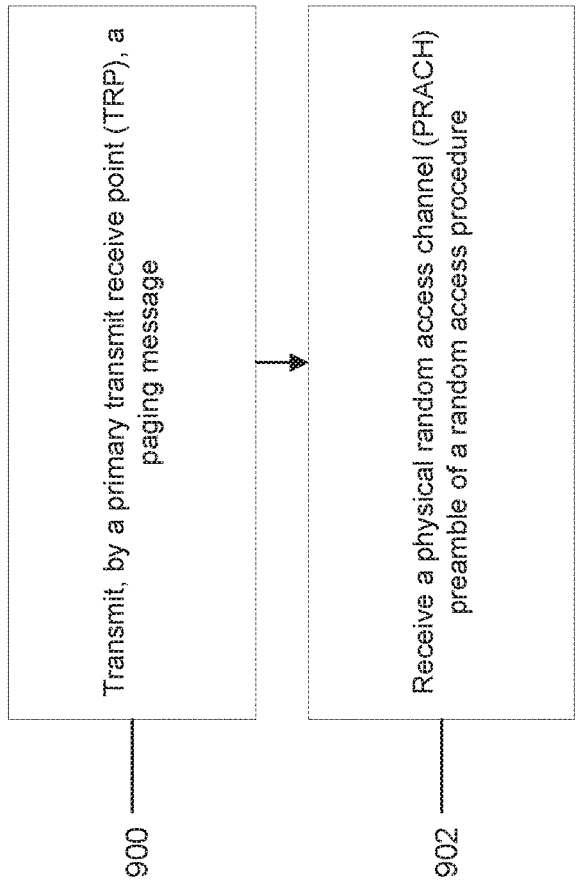

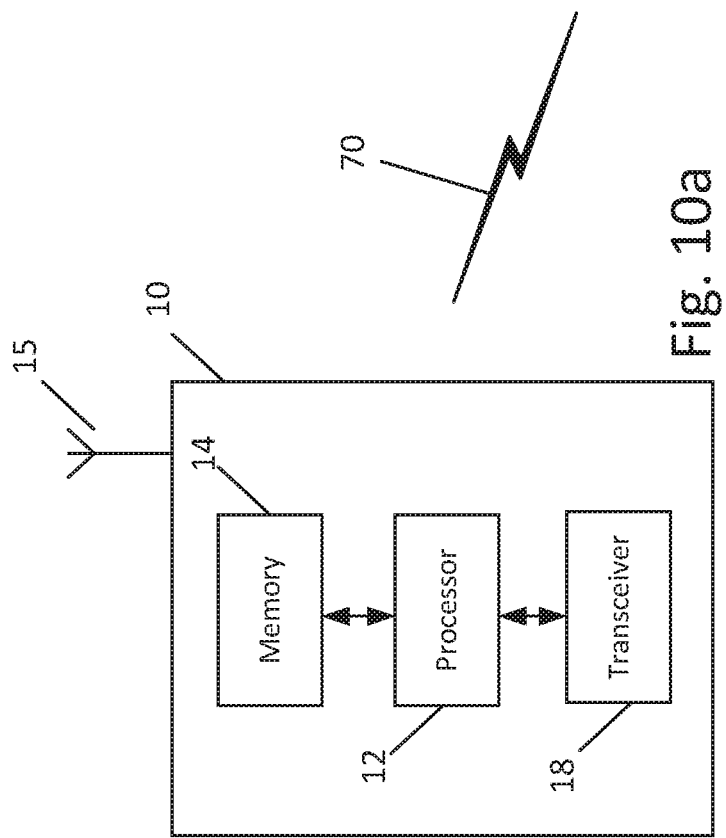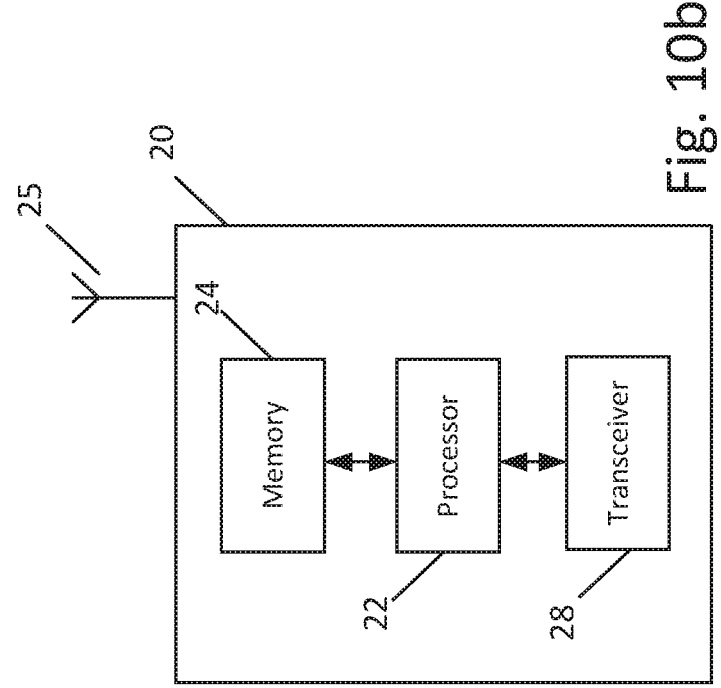

IMPROVING RELIABILITY OF MOBILE-TERMINATED (MT) EARLY DATA TRANSMISSION (EDT)

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for improving reliability of mobile-terminated (MT) early data transmission (EDT).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method can include receiving, from a primary transmit receive point (TRP), a message. The method may include transmitting, to the primary TRP, an indication of a capability to receive a multi-TRP transmission of a message 4 of a random access procedure. The indication may be a physical random access channel (PRACH) preamble. The method may include receiving, from the primary TRP, a random access response (RAR) in a message 2 of the random access procedure based on transmitting the indication of the capability. The RAR may be configured to allocate resources for transmission of information on at least one additional beam. The RAR may comprise at least one field to signal a command to indicate the at least one additional beam in a message 3 of the random access procedure. The method may include transmitting, to the primary TRP, in the message 3 of the random access procedure, at least one index of the at least one additional beam after receiving the RAR.

In a variant, the method may include performing, prior to transmitting the indication, at least one measurement of synchronization signal and physical broadcast channel block (SSB) beams from multiple TRPs, and determining a beam for each of the multiple TRPs based on the at least one measurement. In a variant, the multiple TRPs may be differentiated based on: at least one cell identifier, of the SSB beams, corresponding to the multiple TRPs, or at least one TRP identifier corresponding to different groups of SSB beams. In a variant, the method may include receiving a message triggering the random access procedure, and transmitting the indication based on a SSB beam received from the primary TRP.

In a variant, the indication may be selected from multiple indices or reserved preambles, and the multiple indices or reserved preambles may be different reserved PRACH preambles. In a variant, the at least one index may correspond to at least one TRP other than the primary TRP. In a variant, the method may include receiving a physical downlink control channel (PDCCH) transmission after transmitting the message 3. In a variant, the PDCCH transmission may indicate whether a message 4 of the random access procedure will be transmitted from a single TRP or from multiple TRPs. The multiple TRPs may be determined based on the at least one additional beam indicated in the message 3.

In a variant, the method may include receiving mobile terminated (MT) early data transmission (EDT) on a message 4 of the random access procedure after transmitting a message 3. In a variant, the message 4 may be communicated based on a multi-TRP transmission scheme for a physical downlink shared channel (PDSCH). In a variant, at least one demodulation reference signal (DMRS) associated with the PDSCH may be quasi-collocated with at least one UE-indicated SSB.

According to a second embodiment, a method may include receiving, by a primary transmit receive point (TRP), an indication of a capability of a user equipment (UE) to receive a multi-TRP transmission of a message 4 of a random access procedure. The method may include transmitting, by the primary TRP, a random access response (RAR) in a message 2 of the random access procedure based on receiving the indication of the capability. The method may include the RAR may be configured to allocate resources for transmission of information on at least one additional beam. The RAR may comprise at least one field configured to signal a command to indicate the at least one additional beam in a message 3 of the random access procedure. The method may include receiving, by the primary TRP and in the message 3, at least one index of the at least one additional beam after transmitting the RAR.

In a variant, the method may include transmitting a message triggering the random access procedure, and receiving the indication based on a SSB beam. In a variant, the indication may be selected from multiple indices or reserved preambles, and the multiple indices or reserved preambles may be different reserved PRACH preambles. In a variant, the at least one index may correspond to a single TRP or to multiple TRPs.

In a variant, the method may include determining that the at least one additional beam corresponds to the single TRP, determining to ignore the at least one index based on the at least one additional beam corresponding to the single TRP, and scheduling: a single-TRP message 4 transmission after determining to ignore the at least one index, or a message 4 transmission on multiple beams from the single TRP. In a variant, the method may include transmitting a physical downlink control channel (PDCCH) transmission after transmitting the RAR. In a variant, the PDCCH transmission may be configured to indicate whether a message 4 of the random access procedure will be transmitted from a single TRP or from multiple TRPs, and the multiple TRPs may be determined based on the at least one additional beam indicated in the message 3.

In a variant, the method may include transmitting MT EDT on a message 4 of the random access procedure after receiving the message 3. In a variant, the message 4 may be transmitted with at least one TRP. In a variant, the message 4 may be communicated based on a multi-TRP transmission scheme for a physical downlink shared channel (PDSCH). In a variant, at least one demodulation reference signal (DMRS) associated with the PDSCH may be quasi-collocated with at least one UE-indicated SSB.

According to a third embodiment, a method may include receiving, from a primary transmit receive point (TRP), a message. The message may comprise information identifying: a resource indication configured to indicate at least one of a size and a frequency location of a physical uplink shared channel (PUSCH) resource for a message A of a random access procedure and for indicating at least one additional beam in the random access procedure, and a delay from a physical random access channel (PRACH) occasion for the indicating. The method may include transmitting, to the primary TRP, the message A after receiving the message. The message A may be transmitted using a PRACH preamble followed by an indication of the at least one additional beam in the PUSCH resource.

In a variant, the message may further comprise information identifying a number of additional strong beams that a user equipment (UE) is to indicate. In a variant, a size and frequency location of the PUSCH resource may be fixed. In a variant, the method may include performing a measurement of a strongest synchronization signal and physical broadcast channel (PBCH) block (SSB) beam and of the at least one additional SSB beam. In a variant, the method may include receiving, from at least the primary TRP, mobile terminated (MT) early data transmission (EDT) after transmitting the message A of the random access procedure. In a variant, the MT EDT may be received in a message 2 or a message 4 of the random access procedure.

According to a fourth embodiment, a method may include transmitting, by a primary TRP, a message. The message may comprise information identifying: a resource indication configured to indicate at least one of a size and a frequency location of a physical uplink shared channel (PUSCH) resource for a message A of a random access procedure and for indicating at least one additional beam in the random access procedure. The method may include receiving the message A after transmitting the message. The message A may be transmitted using the physical random access channel (PRACH) preamble followed by an indication of the at least one additional beam in the PUSCH resource.

In a variant, the message may further comprise information identifying a number of additional strong beams that a user equipment (UE) is to indicate. In a variant, a size and frequency location of the PUSCH resource may be fixed. In a variant, the method may include transmitting, on multiple beams or with at least one other TRP, mobile terminated (MT) early data transmission (EDT) after receiving the message A of the random access procedure. In a variant, the MT EDT may be transmitted in a message 2 or a message 4 of the random access procedure.

According to a fifth embodiment, a method may include receiving, from a primary transmit receive point (TRP), a message. The method may include determining a mapping, from the message or system information, of each of a set of reserved physical random access channel (PRACH) preambles to at least one of multiple SSB beams on which a user equipment (UE) determines to receive a multi-TRP transmission. The method may include transmitting a PRACH preamble of a random access procedure. The PRACH preamble may have been selected from the set of reserved PRACH preambles based on at least one beam measurement of the SSB beams and the mapping.

In a variant, the message may indicate a subset of the set of reserved PRACH preambles that map to a set of SSB beams associated with the TRP. In a variant, the mapping may be indicated in the system information. In a variant, the set of reserved PRACH preambles may be associated with at least one SSB beam and at least one TRP.

In a variant, the method may include performing at least one measurement of the SSB beams, and identifying at least one SSB beam, of the SSB beams, to indicate to the TRP based on the at least one measurement. In a variant, the method may include transmitting the PRACH preamble on a PRACH occasion that corresponds to a SSB beam from the primary TRP within a set of SSB beams In a variant, the method may include receiving, from at least the primary TRP, mobile terminated (MT) early data transmission (EDT) on a message 2 or a message 4 of the random access procedure after transmitting the PRACH preamble.

According to a sixth embodiment, a method may include transmitting, by a primary transmit receive point (TRP), a message. The method may include receiving a physical random access channel (PRACH) preamble of a random access procedure. The PRACH preamble may identify at least one selected SSB beam from the SSB beams.

In a variant, the message may further comprise information identifying a mapping between the set of PRACH preambles and the corresponding SSB beams In a variant, the message may indicate a subset of a set of reserved PRACH preambles that map to a set of SSB beams associated with the TRP. In a variant, the mapping may be indicated in system information. In a variant, the set of reserved PRACH preambles may be associated with at least one SSB beam and at least one TRP. In a variant, the method may include receiving the PRACH preamble on a PRACH occasion that corresponds to a SSB beam within a set of SSB beams. In a variant, the method may include transmitting mobile terminated (MT) early data transmission (EDT) on a message 2 or a message 4 of the random access procedure after transmitting the PRACH preamble.

A seventh embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, the fourth embodiment, the fifth embodiment, or the sixth embodiment, or any of the variants discussed above.

An eighth embodiment may be directed to an apparatus that may include circuitry configured to perform the method according to the first embodiment, the second embodiment, the third embodiment, the fourth embodiment, the fifth embodiment, or the sixth embodiment, or any of the variants discussed above.

A ninth embodiment may be directed to an apparatus that may include means for performing the method according to the first embodiment, the second embodiment, the third embodiment, the fourth embodiment, the fifth embodiment, or the sixth embodiment, or any of the variants discussed above.

A tenth embodiment may be directed to a computer readable medium comprising program instructions stored thereon for performing at least the method according to the first embodiment, the second embodiment, the third embodiment, the fourth embodiment, the fifth embodiment, or the sixth embodiment, or any of the variants discussed above.

An eleventh embodiment may be directed to a computer program product encoding instructions for performing at least the method according to the first embodiment, the second embodiment, the third embodiment, the fourth embodiment, the fifth embodiment, or the sixth embodiment, or any of the variants discussed above.

BRIEF DESCRIPTION OF THE DRAWINGS

For proper understanding of example embodiments, reference should be made to the accompanying drawings, wherein:

FIG. 9 illustrates an example flow diagram of a method, according to some embodiments described herein;

FIG. 10a illustrates an example block diagram of an apparatus, according to an embodiment; and FIG. 10b illustrates an example block diagram of an apparatus, according to another embodiment.

DETAILED DESCRIPTION

Figure 1:
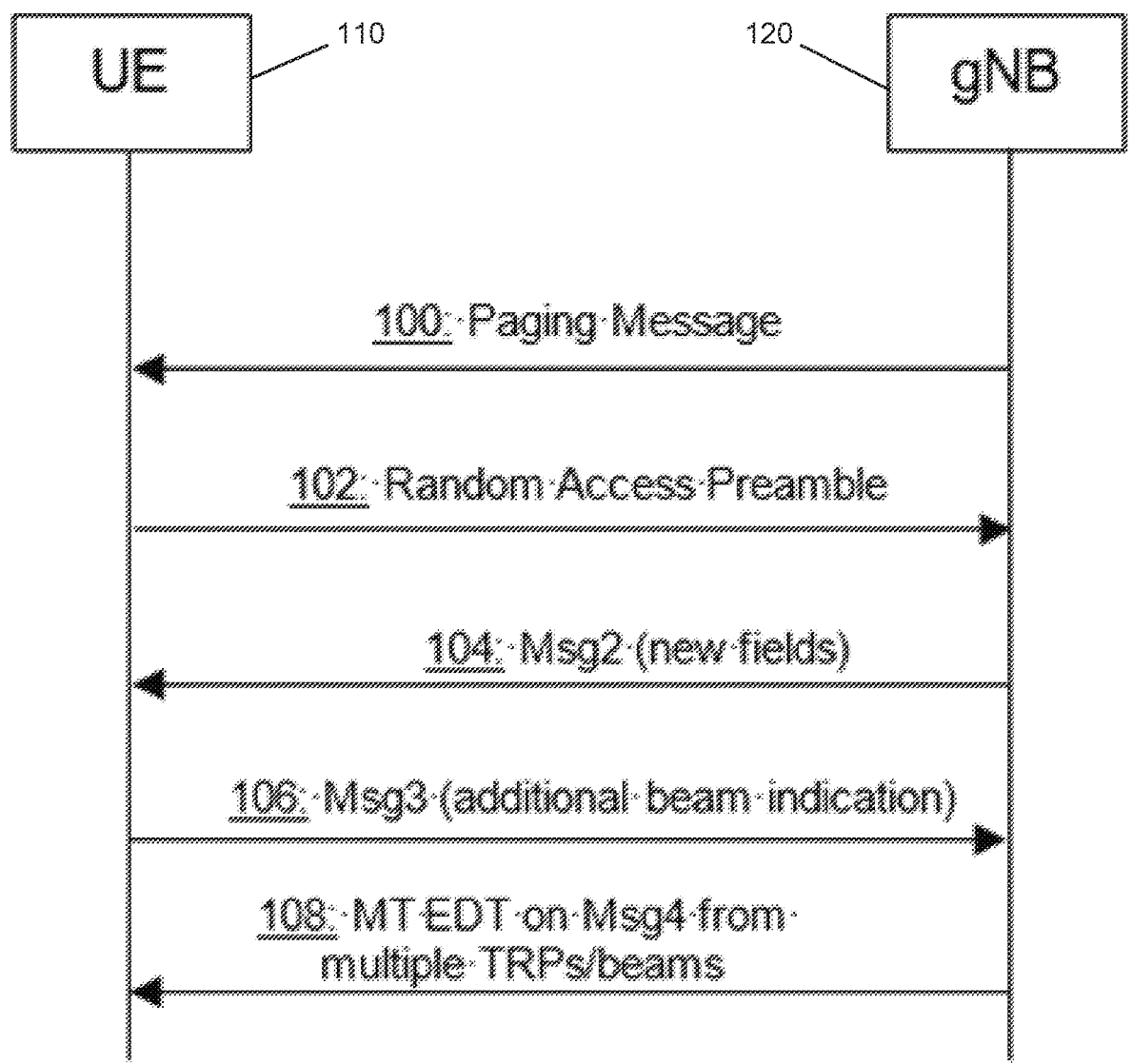
FIG. 1 illustrates an example signaling diagram of a procedure, according to some embodiments described herein.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for controlling operations of a transmit receive point (TRP) and/or a user equipment (UE), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Early Data Transmission (EDT) was first introduced in LTE-M and narrow band Internet of Things (NB-IoT) in Rel-15. In Rel-15, mobile-originated (MO) EDT was specified. EDT enables data transfer between network entity (e.g., a gNB) and a UE during a random access procedure without a need for the UE to go into connected mode. In Rel-15, UL data transmission in a message 3 (Msg3) of the random access procedure for MO EDT was specified for eMTC and NB-IoT.

With respect to NB-IoT, such a technology is likely to target requirements extending beyond what can be supported with LTE-based IoT technologies. The use cases for such a technology include not only massive machine-type communications (MTC) but also industrial applications with more stringent reliability and latency requirements. It is also possible that frequency range 2 (FR2) (millimeter wave (mmWave)) will also be used in non-public networks, particularly in industry environments, because of new spectrum opportunities and potential advantages with isolating deployments at such frequencies. It is expected that features such as EDT that are useful for transfer of small amounts of data with low overhead and latency will also be needed.

Multi-transmit receive point (TRP) transmission may be part of new radio (NR) multiple input, multiple output (MIMO) enhancements. Historically, such an approach has been used to enhance the user data rate. However, the approach is also being used to improve reliability and latency for ultra-reliable low-latency communication (URLLC) transmission. Future enhancements may focus on techniques for the radio resource control (RRC) connected state.

One of the main challenges associated with mmWave deployments is signal blockage. Due to the high attenuation experienced by signals at these frequencies, movement of the user device or other objects in the line of sight with the TRP can cause the signal strength to drop suddenly at the device (e.g., UE). When the network has data for the device, it pages the device. If the amount of data is small, the data may be sent via EDT with low latency. If signal blockage occurs during the data transfer, then the data is not received (either in Msg2 or Msg4).

As such, signal blockage can affect reliability and latency of data sent on MT EDT. For instance, when the UE does not receive the random access response (RAR) (e.g., Msg2) within the RAR window, the UE would reinitiate the random access procedure. Therefore, a delay is incurred in the delivery of data. If the data is carried in Msg4 and the Msg4 is blocked, the UE would fail to transmit an acknowledgment. This would prompt the network entity to attempt a retransmission of Msg4, and a delay is incurred in the delivery of data.

It should be noted that one of ordinary skill in the art would understand that a contention based random access procedure typically comprises four steps, for example, as described in Section 10.1.5.1 and illustrated in FIG. 101.5.1-1, in 3GPP TS 36.300. The messages transmitted in the four steps may be respectively referred to as message 1 (or Msg1), message 2 (or Msg2), message 3 (or Msg3), and message 4 (Msg4). Msg1 may consist of a preamble transmitted in a physical random access channel (PRACH) and Msg2. The response to Msg1 may be transmitted in Msg2 as the random access response (RAR). Msg3 and Msg4, which may be transmitted in the subsequent steps, may resolve any contention among multiple UEs for access to the PRACH that may occur in the first step. Further details on the random access procedure and the different messages may be found in 3GPP TS 36.300 and 3GPP TS 36.321.

Some embodiments described herein may provide for improving reliability of mobile-terminated (MT) early data transmission (EDT). For example, some embodiments described herein may provide signaling support to enable EDT on multiple beams from different TRPs or the same TRP. When the UE is paged, it follows a modified EDT procedure as described herein. Some embodiments described herein may provide a network with information on additional beams that the UE has measured. The network can then choose to use this information to perform EDT. In this way, some embodiments described herein may improve reliability and latency of MT EDT, thereby improving communications between a UE (e.g., similar to apparatus 20 in FIG. 10b) and at least one TRP (e.g., similar to apparatus 10 in FIG. 10a). Therefore, certain example embodiments provide several technological improvements, enhancements, and/or advantages over existing technological processes.

FIG. 1 illustrates an example signaling diagram of a procedure, according to some embodiments described herein. FIG. 1 shows operations that use an indication of additional beam information in a Msg3 for multi-TRP transmission on Msg4. As shown in FIG. 1, the example signaling diagram includes a UE 110 (e.g., similar to apparatus 20 in FIG. 10b) and a network entity (e.g., similar to apparatus 10 in FIG. 10a, such as a gNB 120). A network entity may include one or more TRPs, and communication may be, more specifically, between the UE 110 and one or more TRPs of the network entity.

Prior to the operations shown in FIG. 1, the UE 110 may measure at least one synchronization signal and physical broadcast channel block (SSB) beam from multiple TRPs to determine at least one particular beam from each TRP. For example, the UE 110 may determine at least one particular beam from each TRP based on signal quality measurements, such as signal-to-noise ratio (SNR), reference signal received power (RSRP), reference signal received quality (RSRQ), and/or the like. If each TRP has a separate cell ID, the UE 110 may differentiate between TRPs from the SSBs. Otherwise, if SSBs are distributed across multiple TRPs, TRP IDs associated with different SSB groups may be used to differentiate different TRPs. In some embodiments, the UE 110 may determine a maximum of N strongest beams where N is fixed in the specification.

As shown at 100, the UE 110 may receive, from a primary TRP of the gNB 120, at least one paging message (or a control message, in some embodiments). In some embodiments, the at least one paging message may trigger a random access procedure. As shown at 102, the UE 110 may transmit at least one random access preamble (a physical random access channel (PRACH) preamble) to the primary TRP of the gNB 120. For example, the UE 110 may transmit at least one PRACH preamble based on a particular beam (e.g., a strongest beam or a beam with a highest quality) from the primary TRP (e.g., in a PRACH occasion mapped to the SSB).

In some embodiments, the at least one PRACH preamble may indicate a capability of the UE 110 to receive a multi-TRP transmission of a Msg4 of the random access procedure. For example, the UE 110 may indicate a capability to receive a multi-TRP transmission of Msg4 via selection of a particular PRACH preamble. In some embodiments, a pool of PRACH preambles may be reserved for use by UEs 110 with this capability.

As shown at 104, the primary TRP of the gNB 120 may transmit a Msg2 to the UE 110. In some embodiments, the Msg2 may include a random access response (RAR). In some embodiments, a new RAR may be used for the UE 110. The RAR may allocate resources for transmission of information on one or more additional beams in Msg3 of the random access procedure. In some embodiments, the number of additional beams M to be indicated may be fixed or may be indicated in the RAR (e.g., with 2 bits or with another quantity of bits). In addition to legacy fields, one or more new fields for additional beam indication may be included in the RAR. In some embodiments, the RAR may include at least one field to signal a command to indicate at least one additional beam.

As shown at 106, the UE 110 may transmit a Msg3 to the primary TRP of the gNB 120. In some embodiments, the UE 110 may indicate additional beam information in the Msg3. For example, the UE 110 may indicate one or more indices of a predetermined number M of additional SSB beams corresponding to a same TRP associated with the particular beam (e.g., strongest or highest quality) or to different TRPs. In some embodiments, the UE 110 may indicate M additional SSB beams without knowing if the SSB beams correspond to the same TRP as the originally indicated particular beam (e.g., strongest or highest quality) or to different TRPs. If the one or more additional SSB beams correspond to the same TRP as the particular beam (e.g., strongest or highest quality), the primary TRP can ignore this information and schedule single-TRP Msg4 transmission using a legacy approach. Alternatively, if transmission from multiple beams at the same TRP can be supported, the TRP can schedule Msg4 transmission on multiple beams from the same TRP.

In some embodiments, the primary TRP may schedule multi-TRP transmission of a Msg4. For example, the primary TRP may schedule the multi-TRP transmission after receiving the Msg3 from the UE 110. In some embodiments, the primary TRP may transmit a physical downlink control channel (PDCCH) transmission to the UE 110. In some embodiments, the PDCCH transmission may indicate whether the Msg4 will be transmitted from a single TRP or from multiple TRPs (e.g., the multiple TRPs may be determined based on a beam indicated in the Msg3). In some embodiments, the PDCCH transmission may be transmitted from multiple TRPs.

As shown at 108, the primary TRP of the gNB 120 may transmit, to the UE 110, MT EDT on the Msg4 of the random access procedure. For example, the primary TRP may transmit the MT EDT on the Msg4 after transmitting a RAR to the UE 110. In some embodiments, the MT EDT on the Msg4 is transmitted from multiple TRPs (e.g., using a multi-TRP transmission scheme for a physical downlink shared channel (PDSCH)). For example, PDSCH from different TRPs can use space division multiplexing (SDM), time division multiplexing (TDM), or frequency division multiplexing (FDM). In some embodiments, at least one demodulation reference signal (DMRS) associated with the PDSCH is quasi-collocated with at least one UE-indicated SSB.

In this way, some embodiments described with respect to FIG. 1 may use a modified RAR that includes allocation for additional information in Msg3. In addition, some embodiments may use an indication of one or more additional SSB beams from other TRPs in Msg3.

As described above, FIG. 1 is provided as an example. Embodiments are not limited to the example of FIG. 1.

Figure 2:
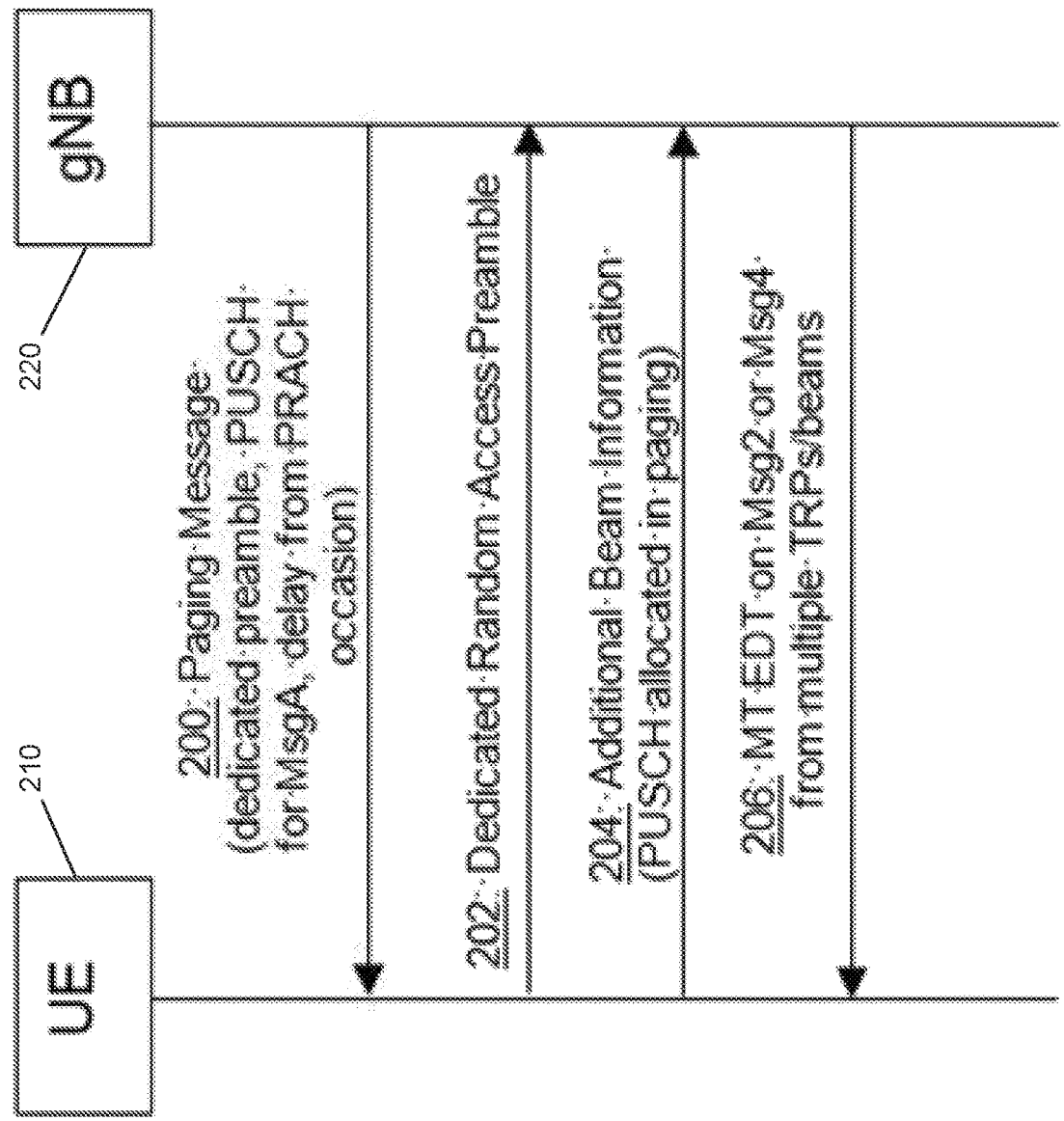
FIG. 2 illustrates an example signaling diagram of a procedure, according to some embodiments described herein.

FIG. 2 illustrates an example signaling diagram of a procedure, according to some embodiments described herein. FIG. 2 shows operations that use an indication of additional beam information in dedicated physical uplink shared channel (PUSCH) for multi-TRP transmission on a Msg2 or a Msg4 for a two-step random access channel (RACH) procedure. As shown in FIG. 2, the example signaling diagram includes a UE 210 (e.g., similar to apparatus 20 in FIG. 10b) and a network entity (e.g., similar to apparatus 10 in FIG. 10a, such as a gNB 220). The network entity may include one or more TRPs, and communication may be, more specifically, between the UE 210 and one or more TRPs of the gNB 220.

As shown at 200, a primary TRP of the gNB 220 may transmit at least one paging message (or at least one control message, in some embodiments) to the UE 210. In some embodiments, the at least one paging message sent by the primary TRP to the UE 210 may indicate at least one location with reference to at least one PRACH occasion where at least one short PUSCH resource (e.g., for at least one MsgA of at least one random access procedure) containing additional beam information can be sent. In some embodiments, a paging message may indicate a number of additional beams that the UE 210 needs to indicate. In some embodiments, at least one resource indication associated with the paging message may indicate at least one size and/or at least one frequency location of the at least one PUSCH resource. In some embodiments, a size of a PUSCH resource may be fixed so that only location information needs to be indicated. For the primary TRP to know which UE 210 supports this capability, an access and mobility management function (AMF) may need to maintain the information identifying that UE 210 is capable and configured for multi-TRP reception.

In some embodiments, the at least one paging message may include information that identifies at least one dedicated PRACH preamble for transmitting a MsgA. Additionally, or alternatively, the at least one paging message may include information that identifies at least one PUSCH transmission following the at least one dedicated PRACH preamble that is configured to indicate one or more additional beams. Additionally, or alternatively, the at least one paging message may include information that identifies at least one delay from at least one PRACH occasion for indicating the one or more additional beams.

As shown at 202, the UE 210 may transmit at least one MsgA to the primary TRP of the gNB 220. For example, the UE 210 may transmit the at least one MsgA after receiving the at least one paging message. In some embodiments, the UE 210 may transmit the at least one MsgA using the at least one dedicated PRACH preamble.

As shown at 204, the UE 210 may transmit additional beam information to the primary TRP of the gNB 220. For example, the UE 210 may transmit the additional beam information using the at least one PUSCH resource allocated in the at least one paging message received from the primary TRP. In some embodiments, the measurement and indication of one or more additional beams (e.g., one or more SSB beams) may be similar to that described above in connection with FIG. 1, with the difference being that the information may be sent to the primary TRP in MsgA instead of Msg3.

As shown at 206, the UE 210 may receive MT EDT after transmitting the at least one MsgA to the primary TRP. For example, the UE 210 may receive the MT EDT on a beam indicated by the UE 210. In some embodiments, the MT EDT may be received in at least one Msg2 or at least one Msg4 of the at least one random access procedure. If the MT EDT is transmitted in a Msg2, the Msg2 may be transmitted from multiple TRPs. If the MT EDT is transmitted in a Msg4, the Msg4 may be transmitted from multiple TRPs, after receiving a Msg3 from the UE, in a manner similar to the operations described with respect to FIG. 1.

In this way, some embodiments described with respect to FIG. 2 may use at least one resource indication in at least one paging message for indication of additional beam information in at least one PRACH occasion. In addition, some embodiments may use at least one indication of one or more additional SSB beams from other TRPs in at least one MsgA.

As described above, FIG. 2 is provided as an example. Embodiments are not limited to the example of FIG. 2.

Figure 3:
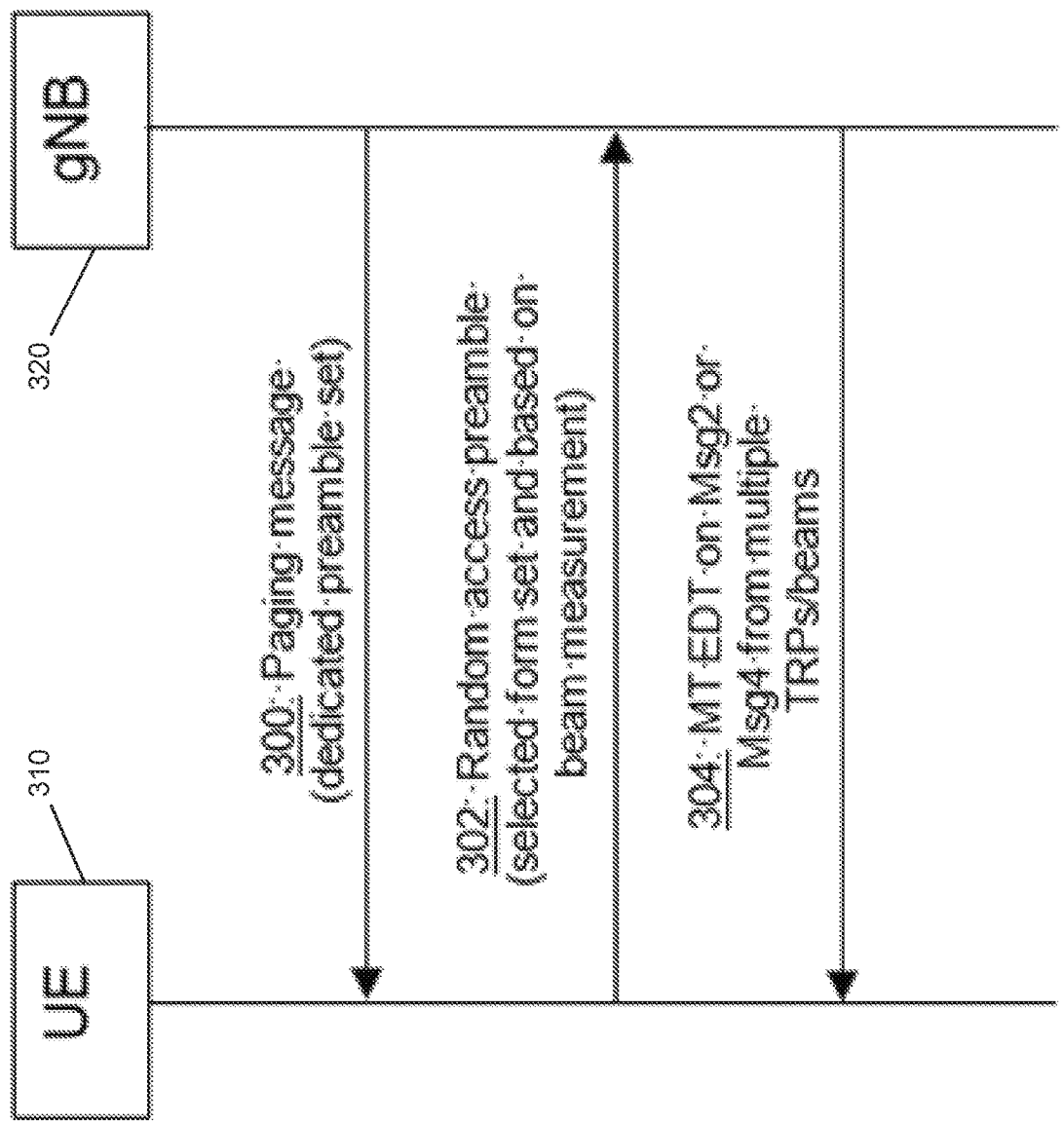
FIG. 3 illustrates an example signaling diagram of a procedure, according to some embodiments described herein.

FIG. 3 illustrates an example signaling diagram of a procedure, according to some embodiments described herein. FIG. 3 shows operations that use a preamble mapping to a set of beams for multi-TRP transmission in a Msg2 or a Msg4. As shown in FIG. 3, the example signaling diagram includes a UE 310 (e.g., similar to apparatus 20 in FIG. 10b) and a network entity (e.g., similar to apparatus 10 in FIG. 10a, such as a gNB 320). A network entity may include one or more TRPs, and communication may be, more specifically, between the UE 310 and one or more TRPs of the gNB 320.

In some embodiments, prior to other operations described herein, a primary TRP of the gNB 320 may reserve a pool of preambles for mapping to multiple beams. For example, these preambles may be reserved from a PRACH pool and may belong to each of the SSBs.

As shown at 300, the primary TRP of the gNB 320 may transmit at least one paging message (or at least one control message, in some embodiments) to the UE 310. In some embodiments, the at least one paging message may comprise information identifying a set of PRACH preambles. When the at least one paging message is sent to the UE 310, the at least one paging message may indicate multiple preambles from at least one reserved pool, with each of the preambles mapping to a set of beams of the serving cells. For example, in the case of N beams and M preambles, each preamble may map to N/M beams. When the UE 310 receives the at least one paging message, the UE 310 may select a PRACH pool corresponding to a SSB. Within a PRACH pool, the UE 310 may select the preamble for transmission from a list of contention free preambles provided to the UE 310.

For this selection, the UE 310 may use one or more beam measurements, and may assign at least one preamble that most suits the UE 310's idle mode beam measurements (e.g., that has a highest relative strength or quality to other beam options). In some embodiments, the UE 310 may measure the beams over all the sets and may determine the closest preamble corresponding to particular set of measured beams (e.g., strongest or highest quality) and/or one or more other sets of measured beams (e.g., the second strongest or highest quality set of beams, the third strongest or highest quality set of beams, etc.). If the last connected beam is known to the UE 310 and the primary TRP, then the preamble selected may correspond to the set of beams containing the last known beam.

In some embodiments, the UE 310 may determine at least one mapping, from the at least one paging message or from system information, of each of the set of PRACH preambles to at least one of the SSB beams on which the UE 310 determines to receive at least one multi-TRP transmission. Each preamble in the pool may be mapped to a set of SSB beams. The mapping between a particular preamble index to a group of beams may be provided via system information or the at least one paging message. In some embodiments, the beams in a set may be transmitted from the same TRP or the beams may be transmitted from different TRPs (e.g., when the SSB beams are distributed over multiple TRPs).

As shown at 302, the UE 310 may transmit at least one random access preamble (e.g., at least one PRACH preamble of at least one random access procedure) to the primary TRP of the gNB 320. The UE 310 may transmit the at least one random access preamble on at least one PRACH occasion. The at least one PRACH occasion may map to a particular SSB beam (e.g., strongest or highest quality) within a set of SSB beams. In some embodiments, if the UE 310 does not receive an RAR, the UE 310 may transmit at least one other preamble (e.g., at least one preamble corresponding to a second strongest or highest quality SSB beam within the set of SSB beams) In some embodiments, if an RAR is not received, the UE 310 may transmit at least one preamble corresponding to the set of SSB beams.

As shown at 304, the primary TRP of the gNB 320 may transmit, to the UE 310, MT EDT on a Msg2 or a Msg 4 of the random access procedure. For example, the gNB 320 may transmit the MT EDT after receiving the PRACH preamble from the UE 310.

In this way, some embodiments described with respect to FIG. 3 include use of an indication of multiple dedicated preamble indices with the paging message. As described above, the indices may be chosen from the PRACH pool corresponding to a detected SSB. In addition, some embodiments use a mapping of a set of SSB beams, from which the UE 310 determines to receive a multi-TRP transmission, to each of the dedicated PRACH preamble indices within the PRACH pool for the SSBs. In addition, some embodiments may use an indication of PRACH preambles (each mapped to multiple beams) in a MsgA or a Msg1 of a random access procedure.

As described above, FIG. 3 is provided as an example. Embodiments are not limited to the example of FIG. 3.

Figure 4:
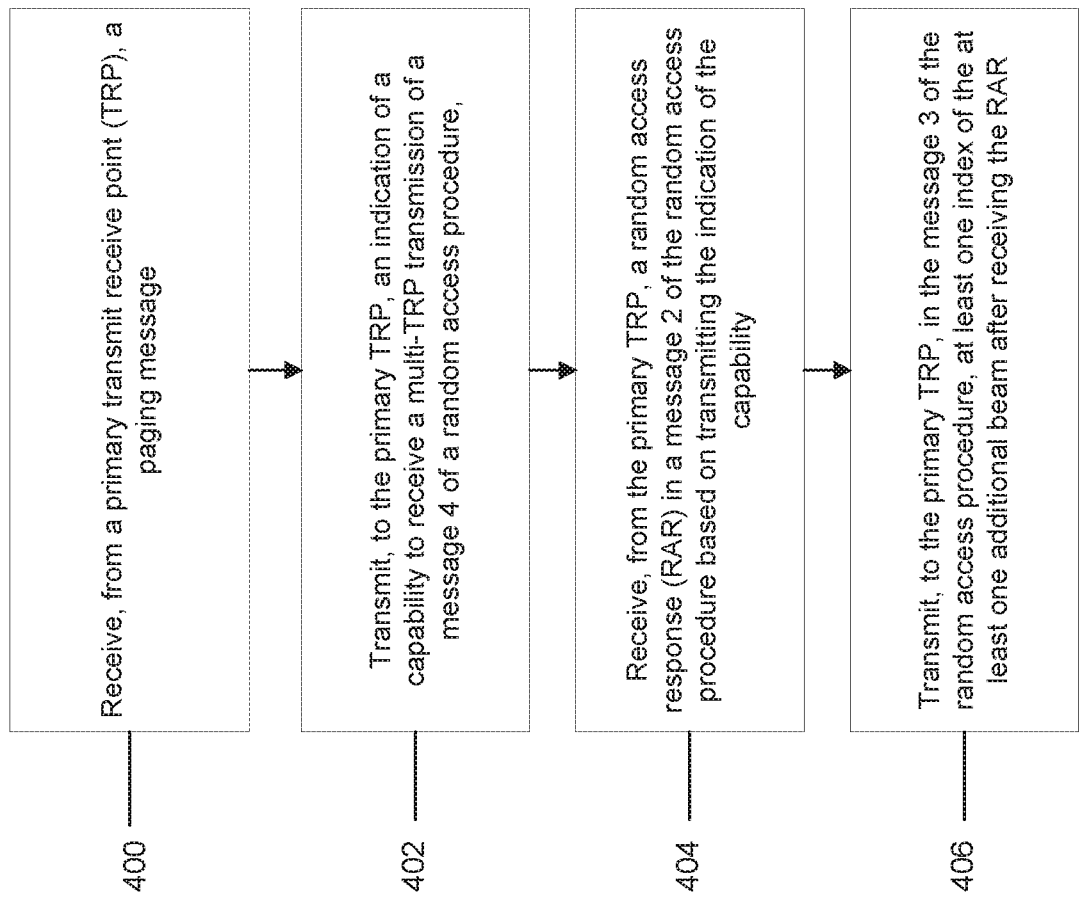
FIG. 4 illustrates an example flow diagram of a method, according to some embodiments described herein.

FIG. 4 illustrates an example flow diagram of a method, according to some embodiments described herein. For example, FIG. 4 illustrates example operations of a UE (e.g., similar to apparatus 20 in FIG. 10*b*). The operations may be similar to some operations shown in FIG. 1.

In an embodiment, the method may include, at 400, receiving, from a primary transmit receive point (TRP), a paging message (or a control message, in some embodiments). For example, the UE may receive the paging message from a primary TRP. In an embodiment, the method may include, at 402, transmitting, to the primary TRP, an indication of a capability to receive a multi-TRP transmission of a message 4 of a random access procedure. For example, the UE may transmit the indication to the TRP after receiving the paging message. In some embodiments, the indication may be a physical random access channel (PRACH) preamble.

In an embodiment, the method may include, at 404, receiving, from the primary TRP, a random access response (RAR) in a message 2 of the random access procedure based on transmitting the indication of the capability. For example, the UE may receive the RAR message in a message 2 (e.g., Msg2) after transmitting the indication of the capability. In some embodiments, the RAR may be configured to allocate resources for transmission of information on at least one additional beam. In some embodiments, the RAR may comprise at least one field to signal a command to indicate the at least one additional beam in a message 3 (e.g., Msg3) of the random access procedure. In an embodiment, the method may include, at 406, transmitting, to the primary TRP, in the message 3 of the random access procedure, at least one index of the at least one additional beam after receiving the RAR. For example, the UE may transmit the at least one index after receiving the RAR in the message 2.

In some embodiments, the method may include performing, prior to transmitting the indication, at least one measurement of synchronization signal and physical broadcast channel block (SSB) beams from multiple TRPs, and determining a beam for each of the multiple TRPs based on the at least one measurement. In some embodiments, the multiple TRPs may be differentiated based on: at least one cell identifier, of the SSB beams, corresponding to the multiple TRPs, or at least one TRP identifier corresponding to different groups of SSB beams. In some embodiments, the method may include receiving a paging message triggering the random access procedure, and transmitting the indication based on a SSB beam received from the primary TRP.

In some embodiments, the indication may be selected from multiple indices or reserved preambles, and the multiple indices or reserved preambles may be different reserved PRACH preambles. In some embodiments, the at least one index may correspond to at least one TRP other than the primary TRP. In some embodiments, the method may include receiving a physical downlink control channel (PDCCH) transmission after transmitting the message 3. The PDCCH transmission may indicate whether a message 4 of the random access procedure will be transmitted from a single TRP or from multiple TRPs. The multiple TRPs may be determined based on the at least one additional beam indicated in the message 3.

In some embodiments, the method may include receiving mobile terminated (MT) early data transmission (EDT) on a message 4 of the random access procedure after transmitting the message 3. The message 4 may be communicated based on a multi-TRP transmission scheme for a physical downlink shared channel (PDSCH). At least one demodulation reference signal (DMRS) associated with the PDSCH may be quasi-collocated with at least one UE-indicated SSB.

As described above, FIG. 4 is provided as an example. Embodiments are not limited to the example of FIG. 4.

Figure 5:
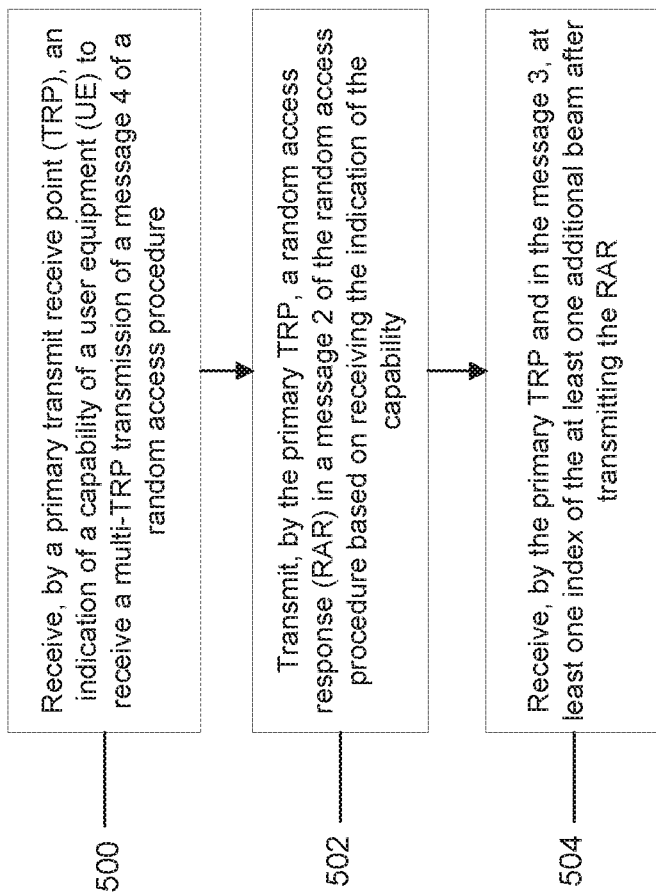
FIG. 5 illustrates an example flow diagram of a method, according to some embodiments described herein.

FIG. 5 illustrates an example flow diagram of a method, according to some embodiments described herein. For example, FIG. 5 shows example operations of a TRP (e.g., similar to, or of, apparatus 10 of FIG. 10*a*). The method illustrated in FIG. 5 may be similar to some operations shown in FIG. 1.

In an embodiment, the method may include, at 500, receiving, by a primary transmit receive point (TRP), an indication of a capability of a user equipment (UE) to receive a multi-TRP transmission of a message 4 of a random access procedure. For example, a primary TRP may receive an indication of a capability from a UE. In some embodiments, the indication may be a physical random access channel (PRACH) preamble.

In an embodiment, the method may include, at 502, transmitting, by the primary TRP, a random access response (RAR) in a message 2 of the random access procedure based on receiving the indication of the capability. For example, the primary TRP may transmit, to the UE, an RAR in a message 2 (e.g., Msg2) after receiving the indication. In some embodiments, the RAR may be configured to allocate resources for transmission of information on at least one additional beam. In some embodiments, the RAR may comprise at least one field configured to signal a command to indicate the at least one additional beam in a message 3 of the random access procedure.

In an embodiment, the method may include, at 504, receiving, by the primary TRP and in the message 3, at least one index of the at least one additional beam after transmitting the RAR. For example, the primary TRP may receive, from the UE, at least one index after transmitting the RAR.

In some embodiments, the method may include transmitting a paging message (or a control message, in some embodiments) triggering the random access procedure, and receiving the indication based on a SSB beam. In some embodiments, the indication may be selected from multiple indices or reserved preambles, and the multiple indices or reserved preambles may be different reserved PRACH preambles. In some embodiments, the at least one index may correspond to a single TRP or to multiple TRPs.

In some embodiments, the method may include determining that the at least one additional beam corresponds to the single TRP, determining to ignore the at least one index based on the at least one additional beam corresponding to the single TRP, and scheduling: a single-TRP message 4 transmission after determining to ignore the at least one index, or a message 4 transmission on multiple beams from the single TRP. In some embodiments, the method may include transmitting a physical downlink control channel (PDCCH) transmission after transmitting the RAR. The PDCCH transmission may be configured to indicate whether a message 4 of the random access procedure will be transmitted from a single TRP or from multiple TRPs, and the multiple TRPs may be determined based on the at least one additional beam indicated in the message 3.

In some embodiments, the method may include transmitting MT EDT on a message 4 of the random access procedure after receiving the RAR. The message 4 may be transmitted with at least one TRP. The message 4 may be communicated based on a multi-TRP transmission scheme for a physical downlink shared channel (PDSCH). At least one demodulation reference signal (DMRS) may be quasi-collocated with at least one UE-indicated SSB.

As described above, FIG. 5 is provided as an example. Embodiments are not limited to the example of FIG. 5.

Figure 6:
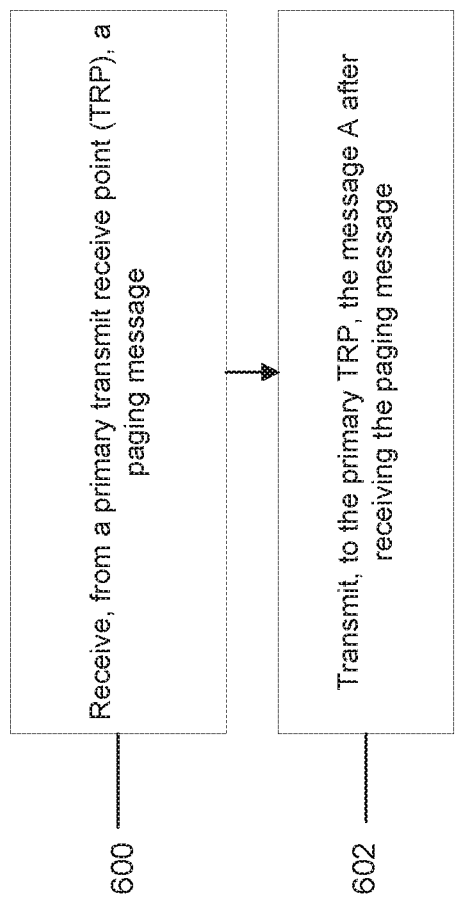
FIG. 6 illustrates an example flow diagram of a method, according to some embodiments described herein.

FIG. 6 illustrates an example flow diagram of a method, according to some embodiments described herein. For example, FIG. 6 illustrates example operations of a UE (e.g., similar to apparatus 20 of FIG. 10b), similar to some operations shown in FIG. 2.

In an embodiment, the method may include, at 600, receiving, from a primary transmit receive point (TRP), a paging message (or a control message, in some embodiments). For example, a UE may receive the paging message from a primary TRP. In some embodiments, the paging message may comprise information identifying: a resource indication configured to indicate at least one of a size and a frequency location of a physical uplink shared channel (PUSCH) resource for a message A (e.g., MsgA) of a random access procedure and for indicating at least one additional beam in the random access procedure, and a delay from a physical random access channel (PRACH) occasion for the indicating.

In some embodiments, the method may include, at 602, transmitting, to the primary TRP, the message A after receiving the paging message. For example, the UE may transmit the message A after receiving the paging message.

In some embodiments, the message A may be transmitted using a PRACH preamble followed by an indication of the at least one additional beam in the PUSCH resource.

In some embodiments, the paging message may further comprise information identifying a number of additional strong beams that a user equipment (UE) is to indicate. In some embodiments, a size and frequency location of the PUSCH resource may be fixed. In some embodiments, the method may include performing a measurement of a strongest synchronization signal and physical broadcast channel (PBCH) block (SSB) beam and of the at least one additional SSB beam. In some embodiments, the method may include receiving, from at least the primary TRP, mobile terminated (MT) early data transmission (EDT) after transmitting the message A of the random access procedure. The MT EDT may be received in a message 2 or a message 4 of the random access procedure.

As described above, FIG. 6 is provided as an example. Embodiments are not limited to the example of FIG. 6.

Figure 7:
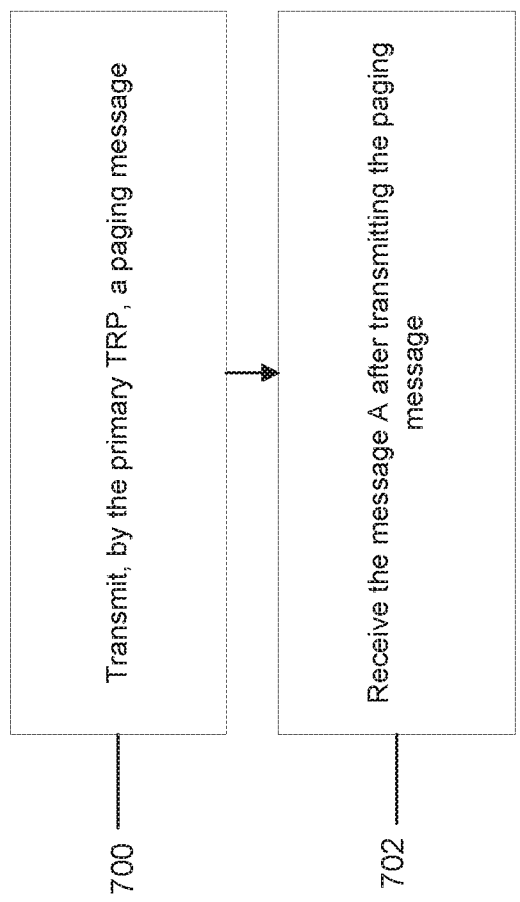
FIG. 7 illustrates an example flow diagram of a method, according to some embodiments described herein.

FIG. 7 illustrates an example flow diagram of a method, according to some embodiments described herein. For example, FIG. 7 illustrates example operations of a TRP (e.g., similar to, or of, apparatus 10 of FIG. 10a), similar to some operations shown in FIG. 2.

In an embodiment, the method may include, at 700, transmitting, by the primary TRP, a paging message (or a control message, in some embodiments). For example, a primary TRP may transmit a paging message to a UE. In some embodiments, the paging message may comprise information identifying: a resource indication configured to indicate at least one of a size and a frequency location of a physical uplink shared channel (PUSCH) resource for a message A (e.g., MsgA) of a random access procedure and for indicating at least one additional beam in the random access procedure. In an embodiment, the method may include, at 702, receiving the message A after transmitting the paging message. For example, the primary TRP may receive the message A from the UE after transmitting the paging message. In some embodiments, the message A may be transmitted using the physical random access channel (PRACH) preamble followed by an indication of the at least one additional beam in the PUSCH resource.

In some embodiments, the paging message may further comprise information identifying a number of additional strong beams that a user equipment (UE) is to indicate. In some embodiments, a size and frequency location of the PUSCH resource may be fixed. In some embodiments, the method may include transmitting, on multiple beams or with at least one other TRP, mobile terminated (MT) early data transmission (EDT) after receiving the message A of the random access procedure. The MT EDT may be transmitted in a message 2 or a message 4 of the random access procedure.

As described above, FIG. 7 is provided as an example. Embodiments are not limited to the example of FIG. 7.

Figure 8:
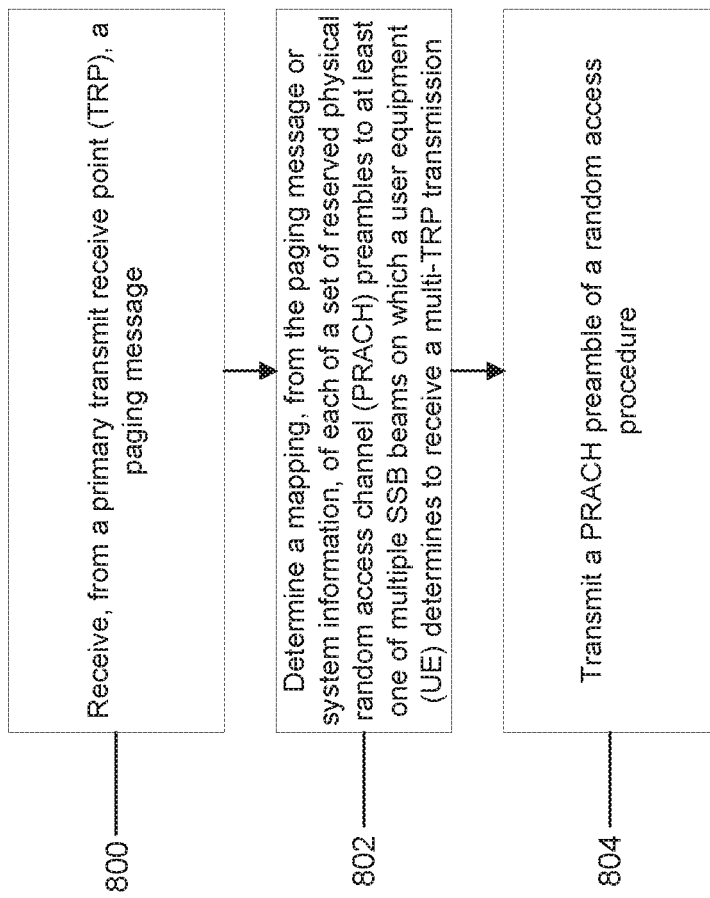
FIG. 8 illustrates an example flow diagram of a method, according to some embodiments described herein.

FIG. 8 illustrates an example flow diagram of a method, according to some embodiments described herein. For example, FIG. 8 shows example operations of a UE (e.g., similar to apparatus 20 of FIG. 10b). The method illustrated in FIG. 8 may be similar to some operations shown in FIG. 3.

In an embodiment, the method may include, at 800, receiving, from a primary transmit receive point (TRP), a paging message (or a control message in some embodiments). For example, a UE may receive a paging message from a primary TRP. In an embodiment, the method may include, at 802, determining a mapping, from the paging message or system information, of each of a set of reserved physical random access channel (PRACH) preambles to at least one of multiple SSB beams on which a user equipment (UE) determines to receive a multi-TRP transmission. For example, the UE may determine the mapping after receiving the paging message.

In an embodiment, the method may include, at 804, transmitting a PRACH preamble of a random access procedure. For example, the UE may transmit a PRACH preamble after determining the mapping. In some embodiments, the PRACH preamble may have been selected from the set of reserved PRACH preambles based on at least one beam measurement of the SSB beams and the mapping.

In some embodiments, the paging message may indicate a subset of the set of reserved PRACH preambles that map to a set of SSB beams associated with the TRP. The mapping may be indicated in the system information. In some embodiments, the set of reserved PRACH preambles may be associated with at least one SSB beam and at least one TRP.

In some embodiments, the method may include performing at least one measurement of the SSB beams, and identifying at least one SSB beam, of the SSB beams, to indicate to the TRP based on the at least one measurement. In some embodiments, the method may include transmitting the PRACH preamble on a PRACH occasion that corresponds to a SSB beam from the primary TRP within a set of SSB beams. In some embodiments, the method may include receiving, from at least the primary TRP, mobile terminated (MT) early data transmission (EDT) on a message 2 or a message 4 of the random access procedure after transmitting the PRACH preamble.

As described above, FIG. 8 is provided as an example. Embodiments are not limited to the example of FIG. 8.

FIG. 9 illustrates an example flow diagram of a method, according to some embodiments described herein. For example, FIG. 9 illustrates example operations of a primary TRP (e.g., similar to apparatus 10 of FIG. 10a). The method illustrated in FIG. 9 may be similar to some operations shown in FIG. 3.

In an embodiment, the method may include, at 900, transmitting, by a primary transmit receive point (TRP), a paging message (or a control message, in some embodiments). For example, a primary TRP may transmit a paging message to a UE. In an embodiment, the method may include, at 902, receiving a physical random access channel (PRACH) preamble of a random access procedure. For example, the primary TRP may receive a PRACH preamble from the UE after transmitting the paging message. In some embodiments, the PRACH preamble may identify at least one selected SSB beam from the SSB beams.

In some embodiments, the paging message may further comprise information identifying a mapping between the set of PRACH preambles and the corresponding SSB beams In some embodiments, the paging message may indicate a subset of a set of reserved PRACH preambles that map to a set of SSB beams associated with the TRP. The mapping may be indicated in system information. In some embodiments, the set of reserved PRACH preambles may be associated with at least one SSB beam and at least one TRP. In some embodiments, the method may include receiving the PRACH preamble on a PRACH occasion that corresponds to a SSB beam within a set of SSB beams. In some embodiments, the method may include transmitting mobile terminated (MT) early data transmission (EDT) on a message 2 or a message 4 of the random access procedure after transmitting the PRACH preamble.

As described above, FIG. 9 is provided as an example. Embodiments are not limited to the example of FIG. 9.

FIG. 10a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), a TRP, and/or a WLAN access point, associated with a radio access network, such as a LTE network, 5G or NR. For example, apparatus 10 may correspond to the gNB or a primary TRP of the gNB of FIGS. 1-9.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10a. In some embodiments, where apparatus 10 represents an IAB node, it may be configured in a DU and MT architecture that divides the IAB functionality. In certain embodiments, the apparatus 10 may comprise more than one DUs.

As illustrated in the example of FIG. 10a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to certain embodiments, apparatus 10 may be controlled by memory 14 and processor 12 to perform the functions associated with any of the embodiments described herein, such as some operations of flow or signaling diagrams illustrated in FIGS. 1-9.

For instance, in one embodiment, apparatus 10 (e.g., a primary TRP) may be controlled by memory 14 and processor 12 to receive an indication of a capability of a user equipment (UE) to receive a multi-TRP transmission of a message 4 of a random access procedure. The indication may be a physical random access channel (PRACH) preamble. In an embodiment, apparatus 10 may be controlled by memory 14 and processor 12 to transmit a random access response (RAR) in a message 2 of the random access procedure based on receiving the indication of the capability. In some embodiments, the RAR may be configured to allocate resources for transmission of information on at least one additional beam. In some embodiments, the RAR may comprise at least one field configured to signal a command to indicate the at least one additional beam in a message 3 of the random access procedure. In an embodiment, apparatus 10 may be controlled by memory 14 and processor 12 to receive, in the message 3, at least one index of the at least one additional beam after transmitting the RAR.

In another embodiment, apparatus 10 (e.g., a primary TRP) may be controlled by memory 14 and processor 12 to transmit a paging message (or a control message, in some embodiments). In some embodiments, the paging message may comprise information identifying: a resource indication configured to indicate at least one of a size and a frequency location of a physical uplink shared channel (PUSCH) resource for a message A of a random access procedure and for indicating at least one additional beam in the random access procedure. In an embodiment, apparatus 10 may be controlled by memory 14 and processor 12 to receive the message A after transmitting the paging message. In some embodiments, the message A may be transmitted using the physical random access channel (PRACH) preamble followed by an indication of the at least one additional beam in the PUSCH resource.

In another embodiment, apparatus 10 (e.g., a primary TRP) may be controlled by memory 14 and processor 12 to transmit, by a primary transmit receive point (TRP), a paging message. In an embodiment, apparatus 10 may be controlled by memory 14 and processor 12 to receive a physical random access channel (PRACH) preamble of a random access procedure. In some embodiments, the PRACH preamble may identify at least one selected SSB beam from the SSB beams.

FIG. 10b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10b.

As illustrated in the example of FIG. 10b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-9.

For instance, in one embodiment, apparatus 20 (e.g., a UE) may be controlled by memory 24 and processor 22 to receive, from a primary transmit receive point (TRP), a paging message (or a control message, in some embodiments). In an embodiment, apparatus 20 (e.g., a UE) may be controlled by memory 24 and processor 22 to transmit, to the primary TRP, an indication of a capability to receive a multi-TRP transmission of a message 4 of a random access procedure. In some embodiments, the indication may be a physical random access channel (PRACH) preamble. In an embodiment, apparatus 20 (e.g., a UE) may be controlled by memory 24 and processor 22 to receive, from the primary TRP, a random access response (RAR) in a message 2 of the random access procedure based on transmitting the indication of the capability. In some embodiments, the RAR may be configured to allocate resources for transmission of information on at least one additional beam. In some embodiments, the RAR may comprise at least one field to signal a command to indicate the at least one additional beam in a message 3 of the random access procedure. In an embodiment, apparatus 20 (e.g., a UE) may be controlled by memory 24 and processor 22 to transmit, to the primary TRP, in the message 3 of the random access procedure, at least one index of the at least one additional beam after receiving the RAR.

In another embodiment, apparatus 20 (e.g., a UE) may be controlled by memory 24 and processor 22 to receive, from a primary transmit receive point (TRP), a paging message. In some embodiments, the paging message may comprise information identifying: a resource indication configured to indicate at least one of a size and a frequency location of a physical uplink shared channel (PUSCH) resource for a message A of a random access procedure and for indicating at least one additional beam in the random access procedure, and a delay from a physical random access channel (PRACH) occasion for the indicating. In an embodiment, apparatus 20 (e.g., a UE) may be controlled by memory 24 and processor 22 to transmit, to the primary TRP, the message A after receiving the paging message. In some embodiments, the message A may be transmitted using a PRACH preamble followed by an indication of the at least one additional beam in the PUSCH resource.

In another embodiment, apparatus 20 (e.g., a UE) may be controlled by memory 24 and processor 22 to receive, from a primary transmit receive point (TRP), a paging message. In an embodiment, apparatus 20 (e.g., a UE) may be controlled by memory 24 and processor 22 to determine a mapping, from the paging message or system information, of each of a set of reserved physical random access channel (PRACH) preambles to at least one of multiple SSB beams on which a user equipment (UE) determines to receive a multi-TRP transmission. In an embodiment, apparatus 20 (e.g., a UE) may be controlled by memory 24 and processor 22 to transmit a PRACH preamble of a random access procedure. In some embodiments, the PRACH preamble may have been selected from the set of reserved PRACH preambles based on at least one beam measurement of the SSB beams and the mapping.

Therefore, certain example embodiments provide several technological improvements, enhancements, and/or advantages over existing technological processes. For example, one benefit of some example embodiments is improved reliability and latency of Mobile Terminated (MT) EDT. Accordingly, the use of some example embodiments results in improved functioning of communications networks and their nodes and, therefore constitute an improvement at least to the technological field of wireless control and management, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

As used herein, the term "BS" may refer to a gNB, a NG-NB, an eNB, a Node B, or the like. In addition, the terms "BS," "gNB," "NG-NB," "eNB," "Node B," or the like may be used interchangeably.

Embodiments described herein apply equally to both singular and plural implementations of the embodiments, regardless of whether singular or plural language is used in connection with describing the embodiments. For example, an embodiment that is described as including a single UE would also apply to an implementation of that embodiment that includes multiple UEs, and vice versa.

PARTIAL GLOSSARY

EDT: Early Data Transmission
MT: Mobile Terminated
PRACH: Physical Random Access Channel
RAR: Random Access Response
TRP: Transmission/Reception Point
UE: User Equipment
SSB: Synchronization Signal Block
gNB: Next generation Node-B

We claim:

1. A method, comprising:
receiving, by a user equipment (UE) and from a primary transmit receive point (TRP), a message;
transmitting, by the UE and to the primary TRP, an indication of a capability to receive a multi-TRP transmission of a message 4 of a random access procedure, wherein the indication is a physical random access channel (PRACH) preamble;
receiving, by the UE and from the primary TRP, a random access response (RAR) in a message 2 of the random access procedure based on transmitting the indication of the capability,
wherein the RAR is configured to allocate resources for transmission of information on at least one additional beam, and
wherein the RAR comprises at least one field to signal a command to indicate the at least one additional beam in a message 3 of the random access procedure; and
transmitting, by the UE and to the primary TRP, in the message 3 of the random access procedure, at least one index of the at least one additional beam after receiving the RAR.

2. The method according to claim 1, further comprising:
performing, prior to transmitting the indication, at least one measurement of synchronization signal and physical broadcast channel block (SSB) beams from multiple TRPs; and
determining a beam for each of the multiple TRPs based on the at least one measurement.

3. The method according to claim 1, wherein the multiple TRPs are differentiated based on:
at least one cell identifier, of the SSB beams, corresponding to the multiple TRPs, or
at least one TRP identifier corresponding to different groups of SSB beams.

4. The method according to claim 1, further comprising:
receiving a message triggering the random access procedure; and
wherein transmitting the indication comprises:
transmitting the indication based on a SSB beam received from the primary TRP.

5. The method according to claim 1, wherein the indication is selected from multiple indices or reserved preambles, and wherein the multiple indices or reserved preambles are different reserved PRACH preambles.

6. The method according to claim 1, wherein the at least one index corresponds to at least one TRP other than the primary TRP.

7. The method according to claim 1, further comprising:
receiving a physical downlink control channel (PDCCH) transmission after transmitting the message 3,
wherein the PDCCH transmission indicates whether a message 4 of the random access procedure will be transmitted from a single TRP or from multiple TRPs, and
wherein the multiple TRPs are determined based on the at least one additional beam indicated in the message 3.

8. The method according to claim 1, further comprising:
receiving mobile terminated (MT) early data transmission (EDT) on a message 4 of the random access procedure after transmitting the message 3,
wherein the message 4 is communicated based on a multi-TRP transmission scheme for a physical downlink shared channel (PDSCH), and
wherein at least one demodulation reference signal (DMRS) associated with the PDSCH is quasi-collocated with at least one UE-indicated SSB.

9. A method, comprising:
receiving, by a primary transmit receive point (TRP), an indication of a capability of a user equipment (UE) to receive a multi-TRP transmission of a message 4 of a random access procedure,
wherein the indication is a physical random access channel (PRACH) preamble;
transmitting, by the primary TRP, a random access response (RAR) in a message 2 of the random access procedure based on receiving the indication of the capability,
wherein the RAR is configured to allocate resources for transmission of information on at least one additional beam, and
wherein the RAR comprises at least one field configured to signal a command to indicate the at least one additional beam in a message 3 of the random access procedure; and
receiving, by the primary TRP and in the message 3, at least one index of the at least one additional beam after transmitting the RAR.

10. The method according to claim 9, further comprising:
transmitting a message triggering the random access procedure; and
wherein receiving the indication comprises:
receiving the indication based on a SSB beam.

11. The method according to claim 9, wherein the indication is selected from multiple indices or reserved preambles, and wherein the multiple indices or reserved preambles are different reserved PRACH preambles.

12. The method according to claim 9, wherein the at least one index corresponds to a single TRP or to multiple TRPs.

13. The method according to claim 9, further comprising:
determining that the at least one additional beam corresponds to the single TRP;
determining to ignore the at least one index based on the at least one additional beam corresponding to the single TRP; and
scheduling:
a single-TRP message 4 transmission after determining to ignore the at least one index, or a message 4 transmission on multiple beams from the single TRP.

14. The method according to claim 9, further comprising:
transmitting a physical downlink control channel (PDCCH) transmission after transmitting the RAR,
wherein the PDCCH transmission is configured to indicate whether a message 4 of the random access procedure will be transmitted from a single TRP or from multiple TRPs, and
wherein the multiple TRPs are determined based on the at least one additional beam indicated in the message 3.

15. The method according to claim 9, further comprising:
transmitting mobile terminated (MT) early data transmission (EDT) on a message 4 of the random access procedure after receiving the message 3,
wherein the message 4 is transmitted with at least one TRP,
wherein the message 4 is communicated based on a multi-TRP transmission scheme for a physical downlink shared channel (PDSCH), and
wherein at least one demodulation reference signal (DMRS) associated with the PDSCH is quasi-collocated with at least one UE-indicated SSB.

16. An apparatus, comprising:
at least one processor; and
at least one memory including computer program code, the at least one memory and computer program code being configured, with the at least one processor, to cause the apparatus to perform:
receiving, from a primary transmit receive point (TRP), a message;
transmitting an indication of a capability to receive a multi-TRP transmission of a message 4 of a random access procedure,
wherein the indication is a physical random access channel (PRACH) preamble;
receiving a random access response (RAR) in a message 2 of the random access procedure based on transmitting the indication of the capability,
wherein the RAR is configured to allocate resources for transmission of information on at least one additional beam, and
wherein the RAR comprises at least one field to signal a command to indicate the at least one additional beam in a message 3 of the random access procedure; and
transmitting in the message 3 of the random access procedure, at least one index of the at least one additional beam after receiving the RAR.

17. The apparatus according to claim 16, wherein the at least one memory and computer program code are further configured, with the at least one processor, to cause the apparatus to perform:
performing, prior to transmitting the indication, at least one measurement of synchronization signal and physical broadcast channel block (SSB) beams from multiple TRPs; and
determining a beam for each of the multiple TRPs based on the at least one measurement.

18. The apparatus according to claim 16, wherein the multiple TRPs are differentiated based on:
at least one cell identifier, of the SSB beams, corresponding to the multiple TRPs, or
at least one TRP identifier corresponding to different groups of SSB beams.

19. The apparatus according to claim 16, wherein the at least one memory and computer program code are further configured, with the at least one processor, to cause the apparatus to perform:
receiving a message triggering the random access procedure;
wherein transmitting the indication comprises:
transmitting the indication based on a SSB beam received from the primary TRP.

20. The apparatus according to claim 16, wherein the indication is selected from multiple indices or reserved preambles, and wherein the multiple indices or reserved preambles are different reserved PRACH preambles.

* * * * *